INVENTOR.
ALEXANDER A. MELIOR

BY
MAHONEY, MILLER & RAMBO
BY Wm. V. Miller
ATTORNEYS

INVENTOR.
ALEXANDER A. MELIOR

BY
MAHONEY, MILLER & RAMBO
BY Wm. V. Miller
ATTORNEYS

INVENTOR.
ALEXANDER A. MELIOR
BY
MAHONEY, MILLER & RAMBO
ATTORNEYS

United States Patent Office 3,263,780
Patented August 2, 1966

3,263,780
AUTOMATIC POWER TRANSMISSION WITH COMBINATION FLUID-TURBINE AND MECHANICAL DRIVE MEANS
Alexander A. Melior, Lucasville, Ohio
Filed May 28, 1964, Ser. No. 370,850
12 Claims. (Cl. 192—3.2)

My invention relates to an automatic power transmission with combination fluid-turbine and mechanical drive means. It has to do, more specifically, with an automatic power transmission in which torque is applied from a driving shaft to a driven shaft through conventional turbine units until the driven shaft reaches a predetermined speed at which time a mechanical drive connects the two shafts together.

The train of transmission of power in present day automobiles is usually from the motor to a converter, to a gear transmission and thence to the drive shaft. The converter is disposed in a housing which is filled with hydraulic fluid or oil. The converter itself has a pump, which is directly connected to the motor, and a turbine, which is directly connected to the driveshaft. The hydraulic fluid within the converter housing, as is well understood, provides a torque-transmitting operative connection between the driving pump and the driven turbine between which slippage will occur. The slippage is a fundamental factor in any hydraulic dynamic power transmission and is a necessary factor during the processes of acceleration of the automobile. However, once the desired acceleration is accomplished so that the automobile reaches traveling speed, slippage, which is constantly converting torque into heat, is no longer desirable but continues to exist with present or prior art transmissions. This factor of slippage is present in each type of turbine system in use in automatic transmissions in automobiles at the present time and considerable effort has been and is being made to reduce the loss of torque caused by this slippage at the time it is not needed, which lowers efficiency, and, therefore, is not desired, without interfering with other desirable and practical characteristics of such transmissions. The efforts with which I am familiar have resulted in some slight reduction in the unwanted slippage but only at considerable complication and, therefore, increase in cost of the transmission. In today's highly sophisticated transmissions, this slippage is still relatively high and means constant loss of power, r.p.m.'s and constant creation of heat.

It has been proposed in the prior art to provide automatic power transmissions with combination fluid-turbine and mechanical drive means. However, with any prior art transmissions with which I am familiar, the results have not been satisfactory. The main fault of these prior art transmissions results from the inability to transmit today's automobile's high horsepower rating and from the lack of programming or control of the mechanical drive unit of the transmission which is adapted to take over the high torque-transmitting function from the fluid-turbine system when the driven shaft reaches a predetermined speed. The mechanical drive usually takes the form of a centrifugal link and the lack of programming or control of the flyweights thereof, both during acceleration and deceleration of the driven shaft, produces additional slippage in the mechanical drive as well as in the fluid turbine drive. The result is that these prior art combination transmissions not only have the usual slippage in the turbine drive but also have additional slippage in the mechanical drive and are unable to transmit necessary high horsepower directly.

It is the main object of my invention to provide an automatic transmission capable of transmitting horsepower without limitation and in which the slippage factor is governed, as desired, that is, the slippage is present when needed and is eliminated when it is not needed.

Another object of my invention is to provide an automatic transmission which comprises a fluid turbine section and a mechanical drive section, with the mechanical drive section so controlled or programmed that it will take over positively to transmit the torque mechanically from the input shaft to the output shaft and only after the output shaft reaches a predetermined speed and which will positively disconnect the mechanical drive and return it to the turbine drive only when the output shaft decelerates to the predetermined speed. Thus, the controlling and programming is such that the necessary slippage will be present in the turbine section during the acceleration to any predetermined speed and during deceleration from the determined speed of the driven output shaft but the fluid drive section will be substantially free of slippage above predetermined speeds.

It is a further object of my invention to provide an automatic transmission which includes a conventional converter having a driving pump and a driven turbine with automatic mechanical means cooperating with the driven turbine when it reaches a predetermined speed to mechanically connect the drive-shaft thereto to eliminate slippage. Since the mechanical drive means is associated with the power turbine rather than the pumps, the mechanical drive connection will become effective only after the drive-shaft and the wheels driven thereby reach a predetermined speed of rotation. Thus, the mechanical drive does not function as a result of the motor operating at a predetermined speed and, therefore driving the pump at such speed, but only when the turbine drives the drive-shaft at the selected speed to drive the wheels at traveling speed.

Another object of my invention is to provide an automatic transmission of the type indicated above which is more practical and efficient in operation due to the provision of the mechanical drive section which takes over during the period when slippage is not desirable, that is, when the driven output shaft is operating above a predetermined speed range, and the provision of novel means to transmit any horsepower and a novel programming or controlling mechanism for the mechanical drive section which substantially eliminates slippage therefrom at the time of its engagement and disengagement.

My invention can be embodied in transmissions having various types of fluid-drive turbine sections, whether or not they are used in automobiles, and it is to be understood that the transmission disclosed herein is for illustrative purposes only.

Various other objects will be apparent from the drawings and the following description.

In the accompanying drawings, I have illustrated the preferred embodiment of my invention but it is to be understood that specific details of construction may be varied without departing from basic principles of the invention.

Figure 1:
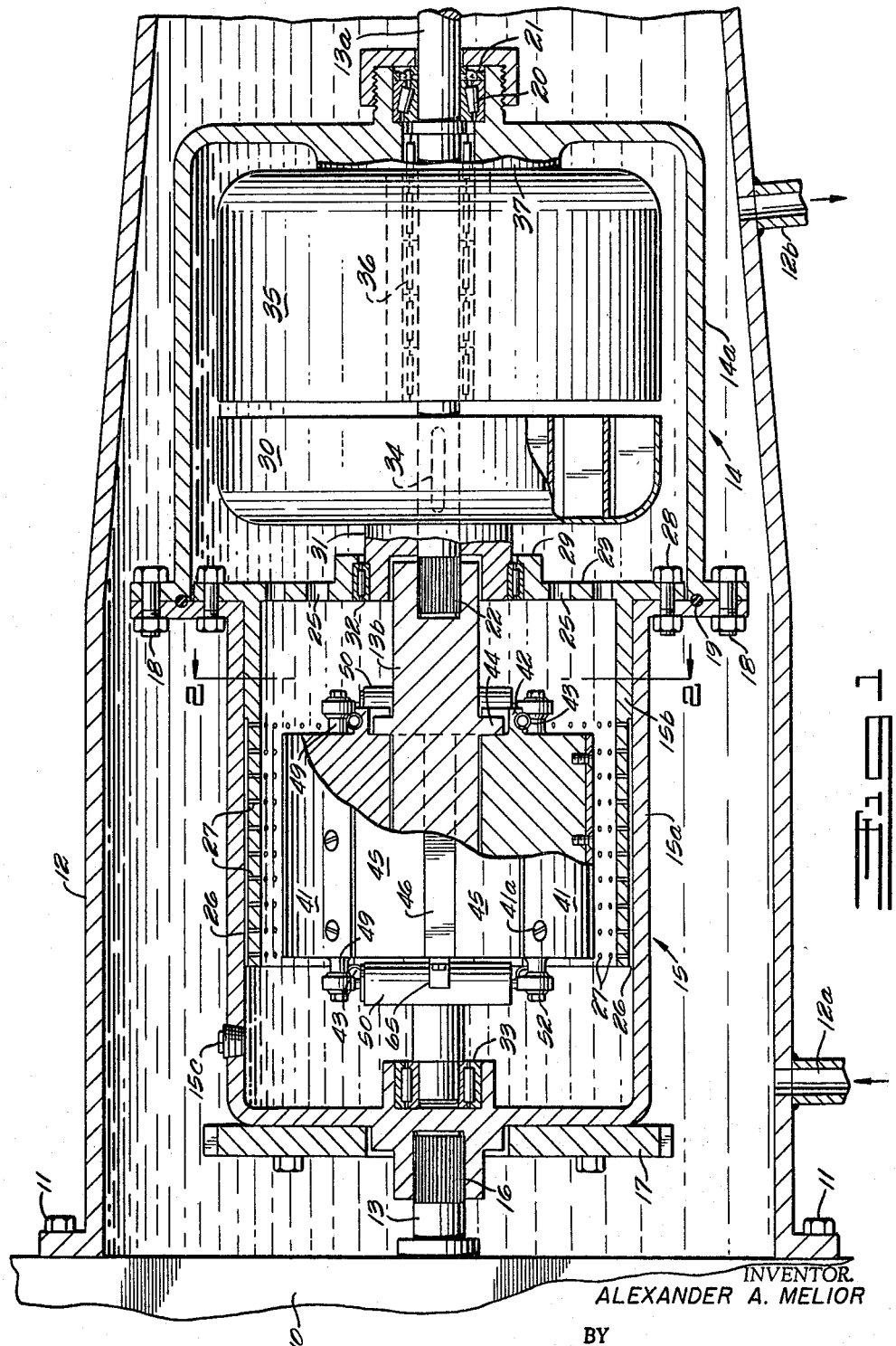
FIGURE 1 is an axial or longitudinal sectional view through a portion of an automatic transmission to which my invention has been applied.

With reference to the drawings, in FIGURE 1 I have illustrated the general arrangement of a portion of an automatic transmission embodying my invention. A fragment of the motor crankcase is indicated at 10 and secured to this crankcase, as by clamp bolts 11, is the water jacket or housing 12 which is to contain the power transmission mechanism of my invention, and which may be provided with a suitably arranged water inlet 12a and outlet 12b. The input or driving shaft 13, which is driven from the crankshaft of the motor in any suitable manner, projects into the housing 12 at one end thereof. The output or driven shaft 13a projects from the opposite end of the housing 12 and is usually connected to a transmission gear unit which drives the drive-shaft of the automobile if my transmission is used on an automobile. However, it is to be understood that although in this description I refer to my transmission as being used on an automobile, it is to be understood that it is capable of other power-transmitting applications.

In the example shown, my transmission is illustrated as comprising mainly the fluid drive or turbine section 14 and the mechanical drive section 15. The input shaft 13 is splined to a housing section 15a by means of a spline end 16 on the shaft which extends into a complemental spline socket in a hub on the outer surface of the closed end of the drum-like housing section. Bolted to this closed end is the usual flywheel gear 17. The opposite end of the housing section 15a is open and is provided with a peripheral flange clamped to the flanged adjacent open end of a housing section 14a by means of the clamp bolts 18, a seal 19 being provided between these clamped flanges. The housing section 14a is also of drum-like form and the output shaft 13a is rotatably mounted in a hub on the closed end thereof by means of a roller bearing 20 with an oil seal 21 associated therewith. Thus, the housing sections 14a and 15a are removably clamped together for rotation about the aligned axes of the shafts 13 and 13a. These housing sections are connected together in a fluid-tight manner and cooperate to provide an enclosed chamber which will be filled with hydraulic fluid, as indicated, and a removable plug 15c may be provided at a filling opening.

The output shaft 13a is directly connected to an aligning jack-shaft 13b by means of a splined inner end 22 which fits into a complemental spline socket in the adjacent end of the shaft 13b. Thus, this end of the shaft 13b is supported by the shaft 13a in the end plate 23 of a clutch drum 15b and the opposite end of the shaft 13b is rotatably mounted by a roller bearing 33 in a hub carried at the inner surface of the closed end of the housing section 15a. The clutch drum 15b has a body of tubular form and its end plate 23 is provide with the relatively large perforations 25 to permit free passage of fluid back and forth between the housing sections 14a and 15a. The tubular body of the drum 15b fits snugly into the associated open end of the drum 15a. The wall of the drum 15b is provided with small radial perforations 27 leading outwardly into grooves 26 which extend longitudinally in the outer surface of the wall and are open at the inner edge of the drum whereby fluid can pass or bleed outwardly through such wall.

The end wall 23 of the drum 15b is extended to form a peripheral locating flange which fits within the drum 14a and abuts the inner surface of the flange on the drum 15a and is clamped thereto by the clamping bolts 28, with the body of the drum 15b telescoped within the body of the drum 15a. The end wall 23 is also provided with a hub 29 which receives the hub 31 of the turbine 30, a roller bearing 32 being provided between these hubs. The hub 31 receives the adjacent end of the jack-shaft 13b. The opposite end of the shaft 13b is rotatably mounted by means of a roller bearing 33 in the closed end of the drum 15a. The turbine 30 is keyed to the output shaft 13a by a key 34.

As previously indicated, the fluid drive or converter of the transmission section 14 may be of various types but will always include at least one pump and at least one turbine. The turbine 30 has been mentioned and the pump is indicated at 35. The turbine 30 and the pump 35 are concentrically disposed on the shaft 13a. The pump 35 is disposed for free rotation on the shaft 13a by means of a suitable roller bearing 36. The turbine 35 is connected by an integral hub portion 37 to the adjacent closed end of the drum or housing 14a. Thus, when the input shaft 13 is driven by the motor, the housing or drum sections 15a and 14a are revolved about the common axis of the aligning shafts 13, 13b and 13a and the hub 31. This will drive the pump 35 since it is a part of the drum 14a. However, at this time, the shaft 13b will not be directly driven but will be gradually accelerated by fluid drive from the pump 35 to the turbine 30, the latter being keyed directly to the shaft 13a and indirectly to the shaft 13b. The jack-shaft 13b will rotate at the same speed as the output shaft 13a since it is splined thereto.

Thus, with the mechanism so far described, there is a fluid drive only between the input shaft 13 and the output shaft 13a. However, I provide a mechanical drive arrangement, which will operate automatically, when the shaft 13a is accelerated to a predetermined speed by the fluid drive section 14. This arrangement is provided in the section 15 to mechanically connect the jack-shaft 13b, and therefore the output shaft 13a, directly to the drum 15a which is directly driven by the input shaft 13. It is actuated in accordance with the speed of rotation of the turbine 30 rather than that of the pump 35.

Figure 2:
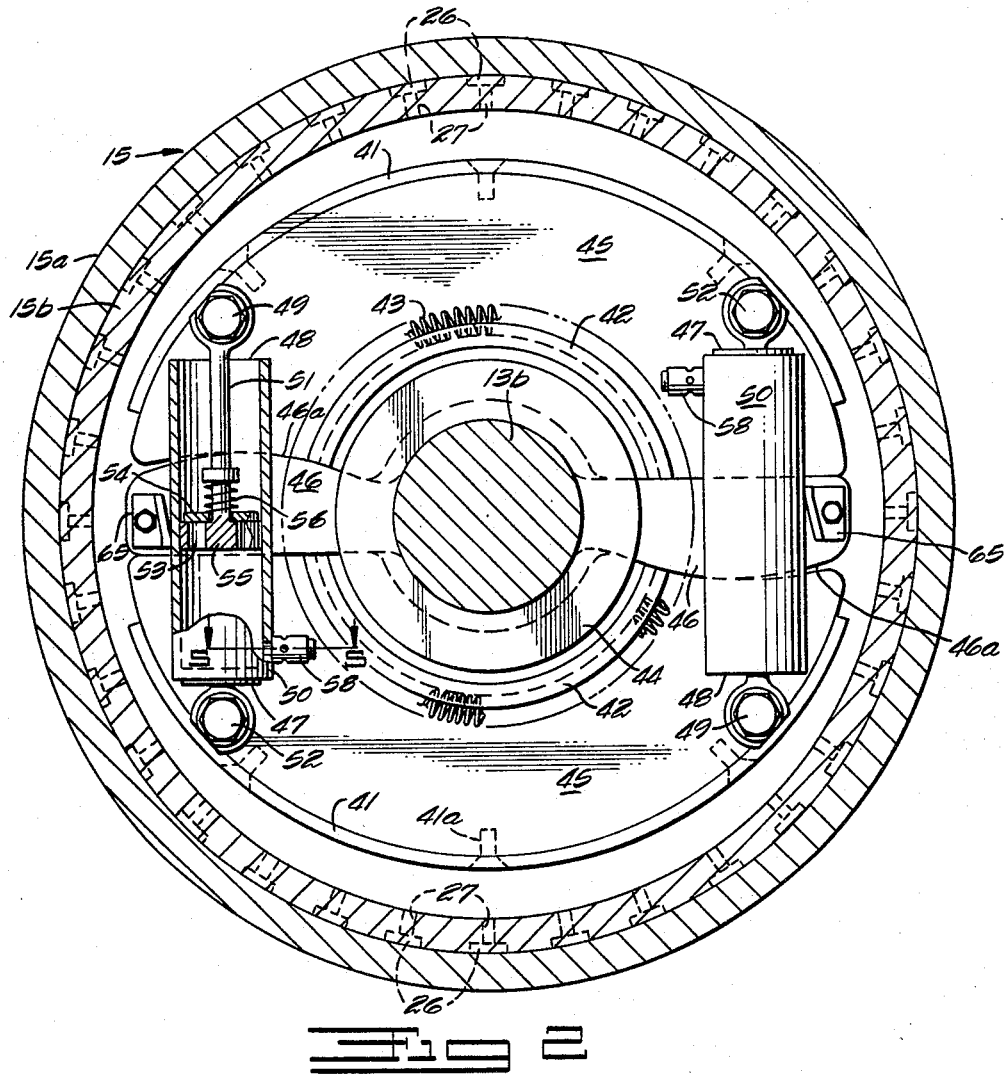
FIGURE 2 is an enlarged transverse sectional view taken along line 2—2 of FIGURE 1, and partly cut away, showing the disengaged condition of the mechanical drive section of the transmission.

The mechanical drive arrangement is of the centrifugal clutch type actuated by centrifugal force and, as indicated in FIGURES 1 and 2, comprises the opposed flyweights 45 which are associated with the shaft 13b within the clutch drum 15b and are mounted for radial movement, in accordance with centrifugal force, into and out of engagement with the clutch drum so as to connect and disconnect that drum and the shaft.

Figure 3:
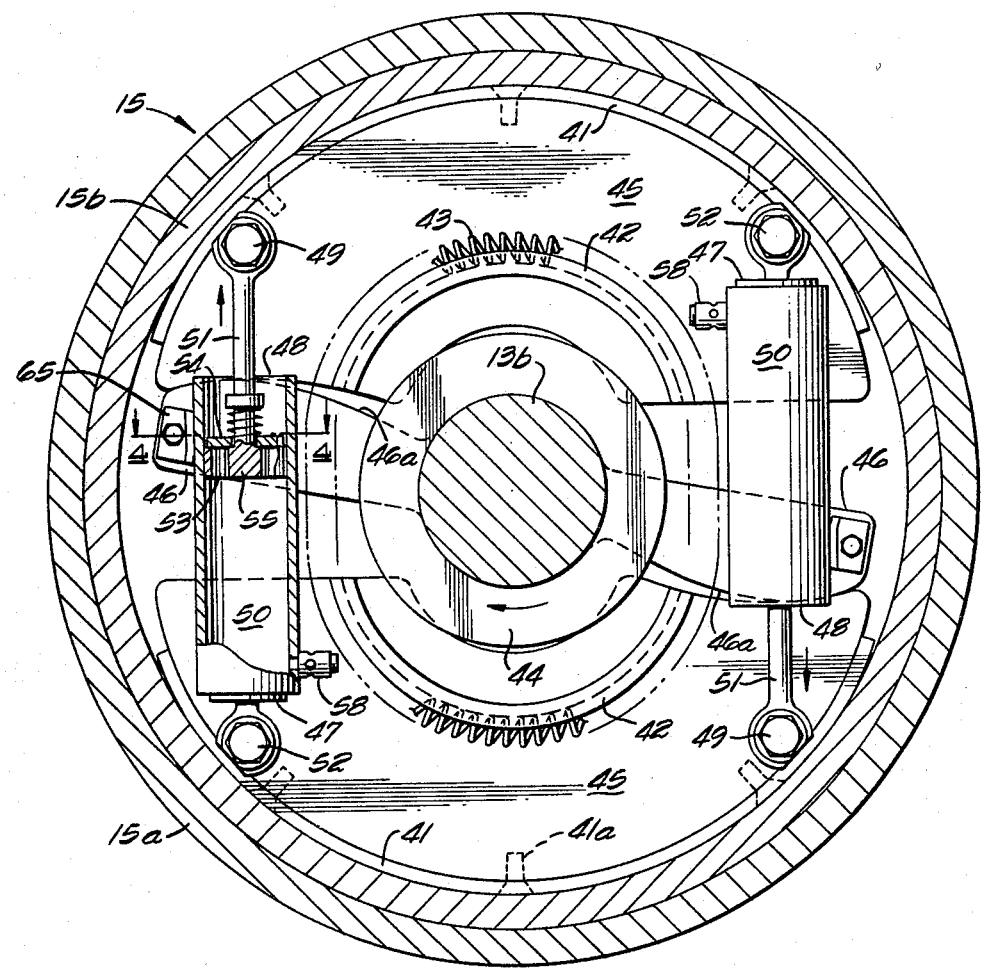
FIGURE 3 is a view similar to FIGURE 2 but showing the engaged condition of the mechanical drive section.
Figure 4:
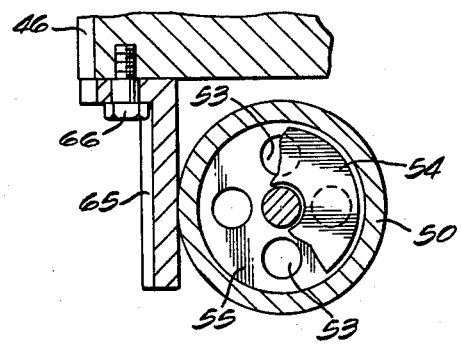
FIGURE 4 is a detail in enlarged section taken through one of the dampener cylinders of the mechanical drive section along line 4—4 of FIGURE 3.

The weights 45 are identical and each is of arcuate, almost semicircular cross section, and is of substantial radial extent so as to provide an outer arcuate surface of substantial area. This outer surface of each weight is provided with a friction shoe 41 of suitable friction material, preferably so attached that it can be removed and replaced after wear, such as by screws or rivets 41a. Each shoe is adapted to contact with the perforated tubular wall of the drum 15b and as it moves toward that wall, fluid is squeezed outwardly through the perforations 27 in the wall. The weights 45 are diametrically opposed and normally embrace the shaft 13b. At one end, each of the weights is provided with an axially outwardly projecting arcuate flange 42. As previously indicated, programming or controlling means is provided for controlling the movement of the weights 45 which results from centrifugal force. This controlling means is illustrated in FIGURES 1–3 as including an annular garter spring 43 that extends around the flanges 42 and is located in grooves provided therein. Constriction of this spring tends to pull the weights 45 radially inwardly toward each other. Axial movement of the weights is prevented by the annular flanges 44 on the shaft 13b at each end of the weights. However, the resistance of the spring 43 can be overcome by centrifugal force at a predetermined speed of the shaft 13b to move the weights 45 radially outwardly.

The control spring 43 has a resistance which is programmed to control outward movement of the flyweights 45. The spring can be such that it exerts a selected inward force tending to resist outward movement of the weights, until a predetermined speed of the shaft 13b is obtained, at which time the weights will initiate their outward movement toward engagement with the clutch drum 15b and during this movement the force exerted by the spring will increase in a linear manner, as will be apparent more clearly from the following description.

As previously indicated, when the turbine 30 is driven, the shaft 13b is driven and the weights 45 will be subjected to centrifugal force. The weights are driven simultaneously with the turbine 30 at the same speed by means of a driving member which includes the driving lugs 46 that extend outwardly from opposite sides of the shaft 13b. These lugs extend axially the full length of the weights and are disposed in the longitudinal spaces between the weights. The lugs 46 are provided with convex or cylindrical driving surfaces 46a, which are at opposite faces of the respective lugs, as shown in FIGURES 2 and 3, and which engage complemental concave surfaces on the associated inner edges of the weights 45. The garter spring 43 normally draws the weights 45 inwardly with their inner edges in contact with the corresponding driving surfaces of the lugs 46 as indicated in FIGURE 2.

Radial movement of the weights 45 is dampened or delayed automatically by the dampener or dashpot units 50. These units, for example, may take the form of cylinder and piston units and preferably a pair of these units is disposed at the axially opposed ends of the weights 45 and the units of each pair are disposed on opposite sides of the shaft 13b.

Figure 5:
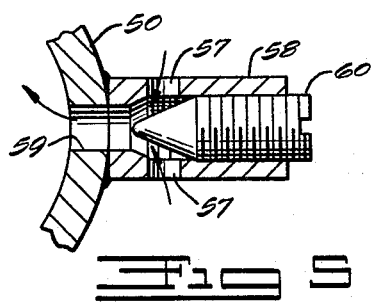
FIGURE 5 is a detail in enlarged section taken along line 5—5 of FIGURE 2 through the needle regulating valve of one of the cylinders.

Each of the cylinders of a unit 50 is closed at one end 47 and open at the opposite end 48 and it will be noted that the cylinders at opposed ends of the weights 45 are reversed relative to their closed and opened ends. The closed end of each cylinder is pivotally mounted on an associated weight 45 by a ball and socket joint, including a pin 49 extending outwardly from the adjacent end of the weight. Each cylinder 50 has a piston 55 slidably mounted therein which has a rod 51 that extends through the open end 48 thereof which is pivoted to the other weight 45 by a ball and socket joint, including a pin 52 that extends outwardly from the adjacent end of the weight. The piston 55 has relatively large fluid passageways 53 extending therethrough and the piston rod side of the piston carries a valve plate 54 which is normally seated on said openings by means of a spring 56 provided on the rod. This provides a one-way check valve arrangement which permits flow of fluid out of the closed end of the cylinder through the piston 55 and thence on outwardly through the open end 48 of the cylinder. To permit entrance of fluid into the closed end 47 of the cylinder, an inlet needle valve arrangement is provided which consists of the needle 60 (FIGURE 5) threaded into a tubular fitting 58 disposed over an inlet opening 59 in the wall of the cylinder. This fitting has radial inlets 57 and the amount of fluid entering the cylinder through these inlets is controlled by setting of the needle-valves 60.

With this arrangement, by setting the needle-valves 60, the length of the period of time required for the weights 45 to travel radially outwardly, after the resistance of spring 43 has been overcome initially, to bring the shoes 41 carried thereby into engagement with the inner surface of the drum 15b and thereby couple the shaft 13b to the drum 15b, can be preselected. In order to prevent centrifugal force from exerting excessive outward forces on each of the cylinders 50 at a right angle to the axis thereof, the arrangement shown best in FIGURES 1–4 is provided. This arrangement comprises restraining lugs or clips 65 which are L-shaped and which are pivoted at 66 to the driving lugs 46 adjacent their outer edges. The clips 65 have outwardly projecting bearing flanges which bear against the associated cylinders 50 at their outer sides. The clips 65 will pivot about their pivots 66 in accordance with change in the angular relationship of the axes of the cylinders 50 and the associated driving lugs 46 so that the clips will always firmly bear against the cylinders and restrain outward movement thereof which centrifugal force, especially at high speeds, tends to cause.

In the operation of this transmission embodying my invention, it will be apparent that the spring 43 will be selected so that the flyweights 45 will be prevented from moving outwardly by centrifugal force until the driven shaft 13a reaches a predetermined speed. The spring 43 can be programmed to hold back outward movement of the weights 45, as a result of centrifugal force, until the turbine 30 reaches a predetermined number of revolutions by means of the fluid drive from the pump 35, the weight shaft 13b and the driven shaft 13a rotating together at the same speed as the turbine 30 since they are directly driven thereby. At this predetermined speed of revolution of the weight shaft 13b, the weights 45 are moved radially outwardly to couple the input shaft 13 to the output shaft 13a, through the drum 15a, the drum 15b and the shaft 13b. The resistance of the spring 43 is overcome by centrifugal force to start outward movement of the weights 45 toward engagement with the drum 15b and this resistance increases in a linear manner upon continued outward movement of the weights. This outward travel is delayed or timed to a predetermined interval determined by the dampener cylinder and piston units 50. The weights will be driven from the shaft 13b by the lugs 46, regardless of the radial positions of the weights relative to the shaft, as shown in FIGURES 2 and 3. Since the units 50 are connected between both weights 45 and the weights are driven by the shaft 13b, they revolve with the weights about the axis of the shaft. The extent of the dampening action and, therefore, the time interval it takes for the weights to move outwardly into engagement with the drum 15b after once starting is determined by the displacement of fluid into the closed ends of the cylinders of the units 50 through the needle valves 60. Thus, this time interval can be selected by the settings of the needle valves 60. Once the weights 45 have moved outwardly to engage the shoes 41 with the drum 15b, they will not move inwardly to disengage such shoes, until the speed of revolution of the weights 45 decreases to an extent to permit the force exerted by the spring 43 to pull the weights 45 radially inwardly. The units 50 will exert substantially no dampening action on this return or disengaging movement of the weights 45, since the inward force on the weights exerted by the spring 43 will cause the fluid within the closed ends of the cylinders to exert an outward thrust through the openings 53 to unseat the valve plates 54. Since the openings 53 cover relatively large areas of the pistons in which they are formed, the fluid from the closed ends of the cylinders can be displaced quickly out through the open ends thereof to permit quick disengagement of the weights 45 and return to their innermost positions close to the shaft 13b.

Figure 6:
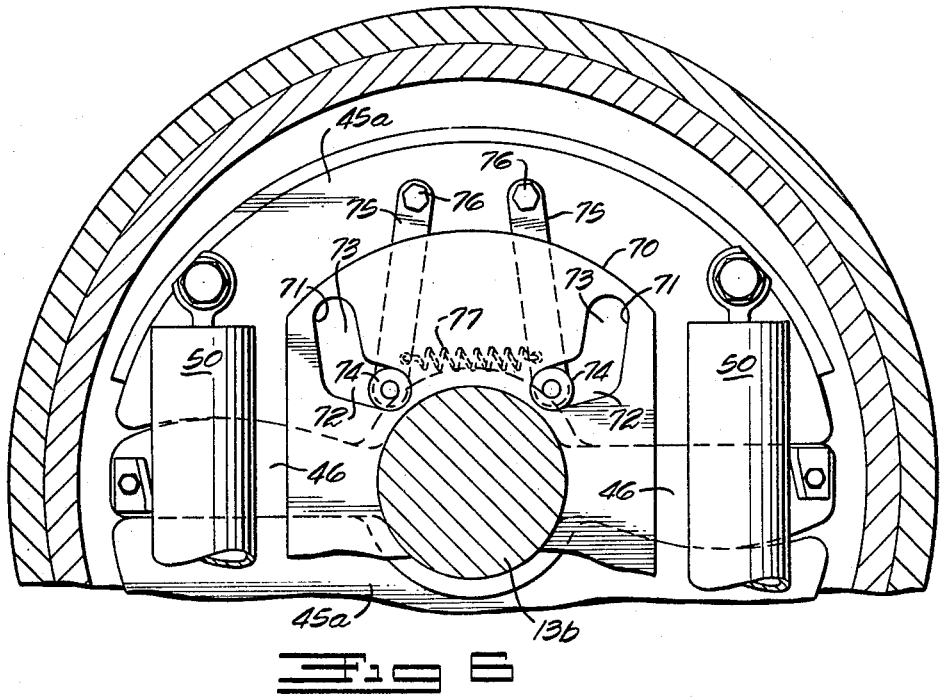
FIGURE 6 is a detail in transverse section showing a modified spring-type programming or control arrangement for the mechanical drive section.

In FIGURE 6, I have illustrated a different simple spring arrangement for controlling outward movement of the flyweights and which can be used in combination with or as a substitute for the spring 43. This spring arrangement can be modified and programmed to offer a predetermined resistance to outward movement of the flyweights and is such that it can be programmed by simple changes to provide a maximum retentive force until the predetermined speed of the weight shaft is reached and the weights start to move outwardly and then to offer substantially lesser resistance to continued outward movement of the weights. Thus, the resistance offered by this spring arrangement is non-linear as contrasted to the linear effect of the spring 43.

More specifically, the weight shaft is indicated at 13b with driving lugs 46 projecting therefrom. The shaft 13b has a fan-shaped cam plate 70 projecting radially therefrom which is driven by the shaft. This plate has a pair of cam grooves 71 formed therein and each of these grooves is of dog-leg form including an inner section 72 which is almost parallel but at a slight angle relative to a center line passing through the opposed driving lugs 46 and an outer section 73 which is almost at a right angle to that center line. The sections 73 are almost parallel but do diverge slightly. Thus, the outer groove sections 73 are almost radial whereas the inner groove sections are at a sharp angle thereto. The grooves 71 receive the cam rollers or followers 74 which are carried on the inner ends of the links 75. These links are pivoted at 76 at their outer ends to the associated flyweights 45a. The lower ends of the links are connected together by a tension spring 77 which offers any predetermined resistance to their spreading apart. It will be understood that two of these spring and cam arrangements are provided for each flyweight 45a, being located at the opposite ends thereof.

As the shaft 13b rotates and drives the weights 46a through the lugs 46, the centrifugal force resulting will tend to produce outward movement of the weights. However, this tendency will be opposed by the resistance of the springs 77. As centrifugal force increases, the springs 77 will be stretched since the rollers 74 will gradually move outwardly in the groove sections 72 but while the rollers are in these sections, there will be substantially no outward movement of the weights 46a. However, as soon as the centrifugal force is sufficient to move the rollers into the outer groove sections 73, the springs 77 offer substantially no further resistance to outward movement of the weights 45a, although there will be some resistance due to the slight non-radial angular relationship of these groove sections 73. Thus, engagement of the mechanical drive is effected without slippage since the weights 45a will not move outwardly into engagement with the clutch drum until after a predetermined speed of revolution of the weights is reached, at which time the weights will then quickly move into engaging position. As the speed of rotation of the shaft 13b decreases below a predetermined range, the springs 77 will quickly move the weights 45a out of engagement and radially inwardly into their innermost positions, thus avoiding slippage at the clutch drum. Modification of the spring unit to offer different resistances can be readily accomplished by substituting springs 77 of different strengths and/or changing the shapes of the cam grooves 71. The units 50 will be used as before in combination with this spring arrangement.

The units 50 will also be used in combination with the spring arrangement of FIGURE 6 to obtain the dampening effect on the outward movement of the flyweights 45a.

Figure 7:
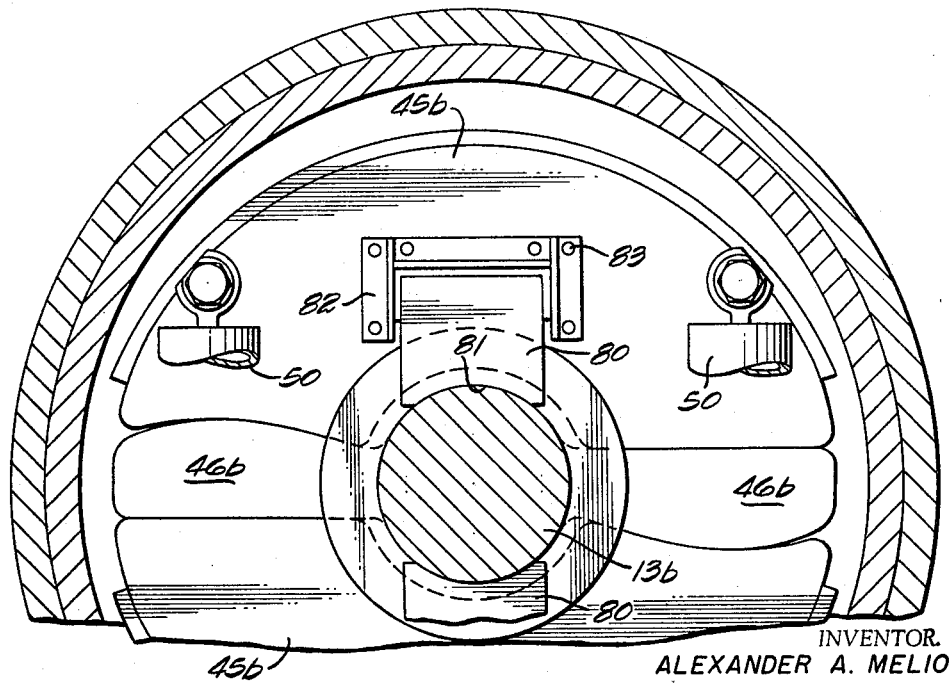
FIGURE 7 is a view similar to FIGURE 6 but showing a magnetic-type control arrangement.

In FIGURE 7, a different arrangement is illustrated for programming the outward movement of the flyweights. In this case, magnetic means is provided which can be used as a substitute for or in addition to the spring means previously described. Permanent magnets 80 are carried at the outer end of each of the weights 45b for cooperating with the shaft 13b. In this structure, the lugs 46b terminate flush with the ends of the flyweights 45b so that the shaft 13b projects from each end of the weights to facilitate cooperation of the magnets 80 therewith. At each end of the weights, a pair of these magnets will be provided in diametrically opposed relationship and their inner ends are curved complemental to that of the shaft, as indicated at 81. Normally, the opposed magnets 80 embrace the shaft. The magnets are rigidly attached to the ends of the weights 45b by the brackets 82 which are yoke-shaped to engage the magnets which are suitably retained therein. These brackets 82 may be fastened by the screws 83 to the ends of the weights. The opposed permanent magnets at the opposite ends of the weights 45b will tend to hold the weights inwardly against the shaft 13b and the lugs 46b. However, a predetermined centrifugal force will overcome this resistance to outward movement. When the weights 45b once start to move outwardly, the continued resistance offered by the magnets to outward movement will diminish rapidly in a non-linear manner in accordance with the distance they move away from the shaft 13b. The magnetic force exerted can be varied by substituting different magnets or the flyweights 45b can be made entirely of permanently magnetic material to select different r.p.m.'s at which the weights will move outwardly. This magnetic arrangement may be used alone to program movement of the weights 45b or it may be used in combination with other or both of the spring arrangements previously described. The units 50 will be used in conjunction with this magnetic programming means and will function as before.

I provide an automatic transmission which is useful though not necesarily limited as the automatic transmission of an automobile. The transmission is a combination of fluid drive and mechanical drive units including, for example, a centrifugal clutch. My invention is applicable to various types of fluid drive units wherein the converter includes at least one driving pump and one driven turbine. The fluid drive unit of my transmission is designed to provide slippage between the pump and turbine elements during the accelerating period but once acceleration is accomplished, slippage is eliminated by automatic functioning of the mechanical driving unit of my transmission. The control of the mechanical drive or coupling unit is accomplished, according to this invention, so that slippage is present when needed but is eliminated when it is not needed. As is well understood, in an automobile, slippage is needed during acceleration to driving speed as well as during deceleration from driving speed and stopping of the automobile with the motor running. The change from fluid drive to mechanical drive and vice vice versa, in my transmission, is accomplished in a continuous cycle by the use of centrifugal force. The change is programmed so that there is substantially no slippage in the mechanical driving unit but the engagement and disengagement is positive at the proper instances. In the conversion of the turbine drive into a direct drive and the reconversion back to a turbine drive, the turbine only is used as the controlling factor. As previously indicated, this turbine is directly connected to the drive-shaft and, therefore, in its revolutions per minute is the true reflection of the speed with which the automobile is traveling at all times. Therefore, functioning of the mechanical drive is dependent on the speed of revolution of the turbine as distinguished from that of the pump which is driven directly from the crankshaft and flywheel of the motor.

Having thus described my invention, what I claim is:

1. An automatic transmission comprising an input shaft, a fluid housing driven by said input shaft, an output shaft extending from said housing, a pump connected to and driven by said housing and located within the housing, a turbine connected to and driving said output shaft, and located within the housing, a weight shaft mechanically connected to and driven by said turbine, said weight shaft carrying flyweights located within said housing, a mechanical driving member fixed to said housing for rotation therewith, said weights being movable in accordance with rotation of said turbine into engagement with said mechanical driving member, means responsive to a predetermined number of revolutions of the driven weight shaft to control movement of the flyweights into engagement with said mechanical driving member, said flyweights being disposed around said weight shaft for radial movement relative thereto, driving lugs carried by said weight shaft and engaging said weights for driving them with the shaft, and piston and cylinder units connected to said weights for controlling the radial movement thereof.

2. An automatic transmission according to claim 1 in which said flyweights are provided in a pair and each of said flyweights is of substantially semi-circular cross section, said driving lugs being on opposite sides of said shaft and extending longitudinally between said weights.

3. An automatic transmission according to claim 2 in which said piston and cylinder units are connected between said semi-circular flyweights.

4. An automatic transmission according to claim 3, in which said cylinders are arranged in pairs at axially opposed ends of the flyweights, the units of each pair being on opposite sides of the weight shaft.

5. An automatic transmission according to claim 4 in which each unit has a piston slidably mounted in a cylinder, a ball and socket connection between the piston and one of said weights and a ball and socket connection between the cylinder and the other of said weights.

6. An automatic transmission according to claim 5 in which means is provided for resisting centrifugal force applied substantially at right angles to the axes of said cylinders, said means comprising members carried by said driving lugs radially outwardly of the cylinders and engaging the cylinders.

7. An automatic transmission according to claim 3 in which each of said units comprises a cylinder having closed and opened ends, a piston slidable in the cylinder and having a rod projecting out of the open end thereof, a flow control inlet valve at the closed end of the cylinder, and an outlet check valve in said piston for controlling displacement of fluid from the closed end of the cylinder.

8. An automatic transmission according to claim 7 in which the flow control valve is an adjustable needle valve, and the check valve is a plate seated on openings in the piston by a cooperating spring.

9. An automatic transmission according to claim 1 including programming means to control movement of the flyweights into engagement with said mechanical driving member and comprising spring means which normally resists radial outward movement of said weights relative to said weight shaft.

10. An automatic transmission according to claim 9 in which said spring means comprises a garter spring extending around the weights.

11. An automatic transmission according to claim 9 including links pivoted to each weight member outwardly of said shaft, said spring means comprising a spring connected between said links, a cam plate extending radially from said shaft adjacent said links, said links carrying cam followers which operate in cam grooves formed in said plate.

12. An automatic transmission according to claim 1 including programming means to control movement of the flyweights into engagement with said mechanical driving member and comprising magnetic means on said weights for resisting radial outward movement of the weights away from the shaft.

References Cited by the Examiner

UNITED STATES PATENTS

| | | | |
|---|---|---|---|
| 1,843,712 | 2/1932 | Else | 192—105 |
| 2,034,757 | 3/1936 | Herreshoff | 192—3.2 |
| 2,762,483 | 9/1956 | Clark | 192—105 |
| 2,863,320 | 12/1958 | Mendenhall | 192—84 |
| 2,915,159 | 12/1959 | Gubelmann | 192—109 |
| 3,039,577 | 6/1962 | Dahlman et al. | 192—105 |

FOREIGN PATENTS

| | | |
|---|---|---|
| 1,160,448 | 3/1958 | France. |
| 401,826 | 11/1933 | Great Britain. |

DAVID J. WILLIAMOWSKY, *Primary Examiner.*